US005731032A

United States Patent [19]
Orr

[11] Patent Number: 5,731,032
[45] Date of Patent: Mar. 24, 1998

[54] METHOD OF USE OF A COATING COMPOUND FOR LIQUID-FERTILIZER HOLDING VESSELS, AND LIQUID FERTILIZERS

[75] Inventor: Michael L. Orr, Pocatello, Id.

[73] Assignee: J.R. Simplot Co., Pocatello, Id.

[21] Appl. No.: 677,557

[22] Filed: Jul. 8, 1996

[51] Int. Cl.⁶ .................................................. B05D 7/22
[52] U.S. Cl. .................. 427/230; 106/18.32; 106/18.35; 71/DIG. 4; 422/7; 422/15; 422/16
[58] Field of Search .................. 106/18.32, 18.35; 210/755, 764; 422/7, 15, 16; 71/DIG. 4; 427/230

[56] References Cited

U.S. PATENT DOCUMENTS

| | | |
|---|---|---|
| 3,197,301 | 7/1965 | Lutz .............................................. 71/28 |
| 4,159,901 | 7/1979 | Beestman et al. ..................... 422/15 X |
| 5,128,050 | 7/1992 | Gill ......................................... 210/255 |

OTHER PUBLICATIONS

Pope, Daniel H., et al., "Some Experiences with Microbiologically Influenced Corrosion of Pipelines", MP, May 1995, pp. 23–28.

Nguyen, D.T., et al., "Corrosion of Mild Steel Exposed to Inhibited Urea–Ammonium Nitrate Solution at Ambient Temperature Under Static Conditions", Article, Aug. 25–30, 1991, Natl. Meeting of the American Chemical Society, N.Y., 7 pages.

Lonza, Inc., "Barquat MB–50", and Barquat MB–80, Material Safety Data Sheet, 6 pages, no date.

Lonza, Inc. "Bardac 208M", Material Safety Data Sheet, 7 pages, no date.

Primary Examiner—Michael Lusignan
Attorney, Agent, or Firm—Wells, St. John, Roberts, Gregory & Matkin, P.S.

[57] ABSTRACT

In one aspect, am anti-corrosion treatment method of reducing internal corrosion of a liquid nitrogen fertilizer holding vessel comprising providing at least one quaternary-amine-comprising compound within the vessel. In another aspect, an anti-corrosion treatment method of reducing corrosion of a liquid nitrogen fertilizer holding vessel comprising: a) providing a substantially insoluble liquid film of a quaternary-amine-comprising compound over a volume of liquid nitrogen fertilizer within a steel vessel; and b) coating internal sidewalls of the steel vessel with the quaternary-amine-comprising compound as the volume of liquid fertilizer increases and decreases within the vessel. In another aspect, an anti-corrosion mixture comprising: a) a liquid nitrogen fertilizer solution; and b) a quaternary-amine-comprising compound within the liquid nitrogen fertilizer solution.

39 Claims, 3 Drawing Sheets

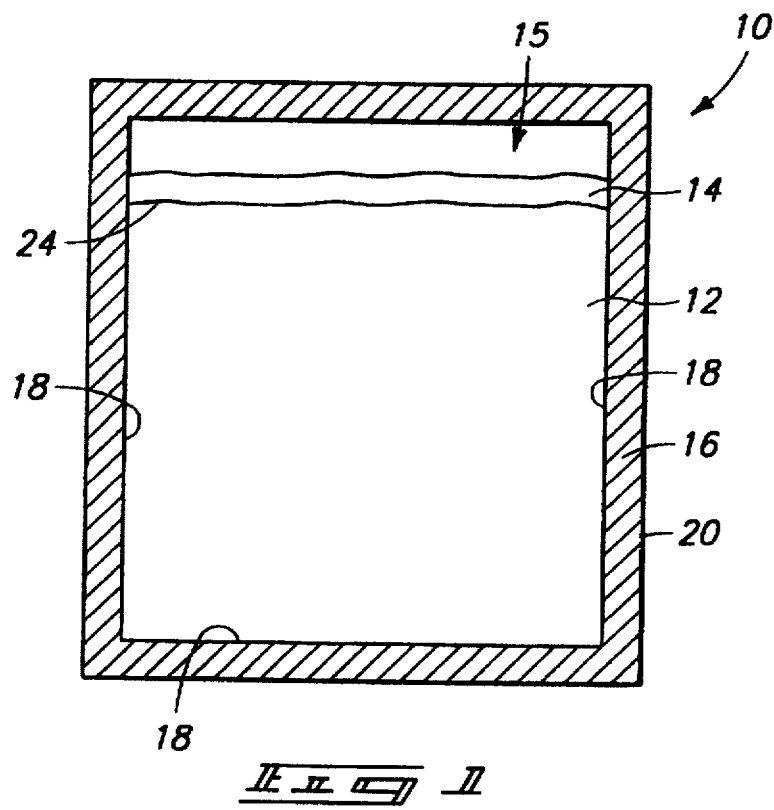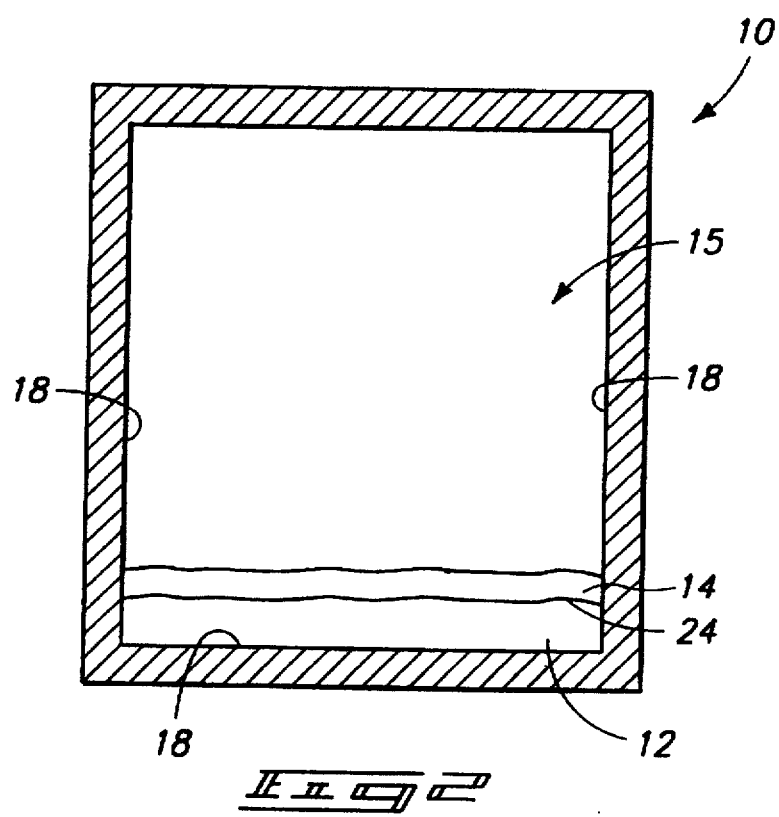

METHOD OF USE OF A COATING COMPOUND FOR LIQUID-FERTILIZER HOLDING VESSELS, AND LIQUID FERTILIZERS

TECHNICAL FIELD

This invention pertains to methods for reducing corrosion in liquid-fertilizer holding vessels.

BACKGROUND OF THE INVENTION

Fertilizer is one of the largest market commodities of the chemical industry. The crucial elements that have to be added to soil in considerable quantities in the form of fertilizer are nitrogen, phosphorus, and potassium, in each case in the form of a suitable compound. Although numerous smaller quantities of elements might also be provided in fertilizers in trace quantities, fertilizers are based principally on these three elements.

Nitrogen is present in vast quantities in air, and commonly enters the fertilizer production process as ammonia, typically produced by fixation of atmospheric nitrogen. Phosphorus and potassium are extracted as mineral sources, and then converted into a form suitable for fertilizer use.

Fertilizer is typically manufactured into liquid or granular solid form, with the term "liquid" encompassing solutions, slurries and suspensions. Large scale agriculture typically utilizes liquid nitrogen based fertilizer, which is stored in large metallic holding vessels close to the site of application. Further, fertilizer manufacturers typically also store and ship liquid nitrogen based fertilizer in metallic vessels. The vessels are commonly formed from either carbon steel or stainless steel, as such steel holding vessels are capable of withstanding climatic temperature variation better than other materials, such as, for example, plastics. The metallic containers are utilized throughout the world, including the northern climates and substantially equatorial climates. Among the liquid nitrogen based fertilizers stored in such vessels are ammonium sulfate, urea ammonium nitrate, ammonium polyphosphate, and calcium ammonium nitrate fertilizers.

A problem associated with storing liquid nitrogen based fertilizer in metallic vessels is corrosion on the internal surfaces of the holding vessels. Such corrosion can be caused by chemical attack on the metal the vessels by components in the liquid fertilizer. Such corrosion can also be caused by oxidation of the metal of the vessels occurring when the liquid nitrogen fertilizer is drawn down in a holding vessel and the internal surface of the vessel is thereby exposed to atmospheric oxygen. Other internal sidewall corrosion mechanisms can also occur.

In a typical yearly cycle in a northern climate, liquid nitrogen fertilizer will be moved through holding vessels from about March through October, the growing season in the Northern climates. During this period, the liquid fertilizer level within the holding vessels will fluctuate as the vessels are repeatedly filled and drained. Accordingly, the internal surface of the vessel is repeatedly exposed to chemical attack from liquid fertilizer, followed by oxidative attack as the liquid fertilizer level is drawn down.

During a period from about November to about March, the level of liquid fertilizer within the liquid-fertilizer holding vessels will remain static. The vessel will thus contain a liquid fertilizer to a given level and a head space above the liquid fertilizer. During the period from about November to about March, the vessel internal surface adjacent the liquid fertilizer will be continuously exposed to chemical attack from the liquid fertilizer, while the internal surface adjacent the head space will be continuously exposed to oxidative damage.

The corrosion of liquid-fertilizer holding vessels causes millions of dollars of annual expenses due primarily to the costs of repairing and replacing the damaged vessels. Also, the corrosion of liquid-fertilizer holding vessels can lead to formation of particulates, which eventually form an undesired sludge within a liquid fertilizer. Accordingly, it would be desirable to reduce the rate of corrosion of liquid-fertilizer holding vessels.

Presently, there has been some effort to reduce the corrosion caused by liquid fertilizer by adding organophosphates and/or fatty acid phosphoric materials to the liquid fertilizers. Mixed results have been obtained from the use of such additives, with corrosion of liquid-fertilizer holding vessels continuing to be a problem.

Another problem with liquid fertilizer can be the presence of organic particulates in the fertilizer. Such organic particulates can undesirably lower marketability of the liquid fertilizer. Accordingly, it would be desired to remove organic particulates from within a liquid fertilizer.

BRIEF DESCRIPTION OF THE DRAWINGS

Preferred embodiments of the invention are described below with reference to the following accompanying drawings.

FIG. 1 is a cross-sectional diagrammatic side view of a liquid-fertilizer holding vessel being treated according to a first embodiment of the present invention.

FIG. 2 shows the FIG. 1 vessel at a step subsequent to the step of FIG. 1.

DETAILED DESCRIPTION OF THE PREFERRED EMBODIMENTS

Figure 3:
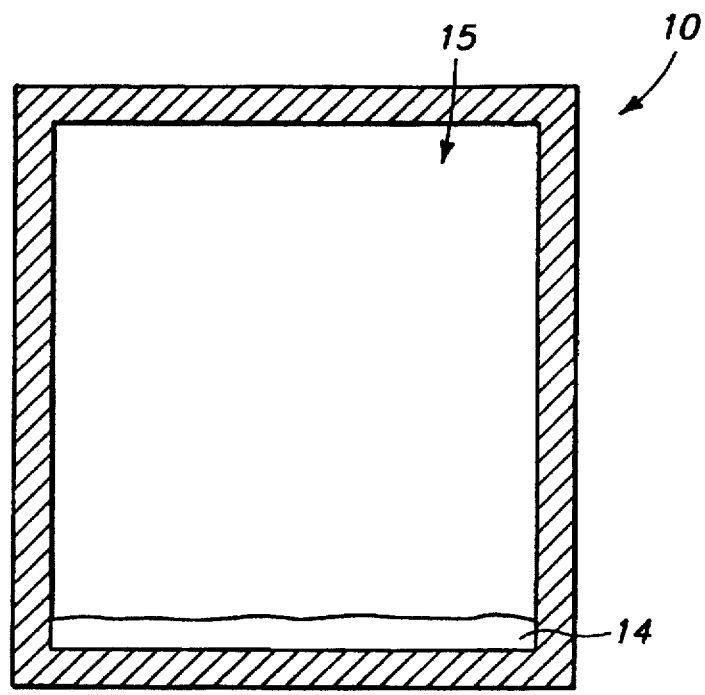
FIG. 3 is a cross-sectional diagrammatic side view of a liquid-fertilizer holding vessel being treated according to a second embodiment of the method of the present invention.

This disclosure of the invention is submitted in furtherance of the constitutional purposes of the U.S. Patent Laws "to promote the progress of science and useful arts" (Article 1, Section 8).

In one aspect, an anti-corrosion treatment method of reducing internal corrosion of a liquid nitrogen fertilizer holding vessel comprises providing at least one quaternary-amine-comprising compound within the vessel.

In another aspect, an anti-corrosion treatment method of reducing corrosion of a liquid-fertilizer holding vessel comprises:

flowing a liquid-fertilizer solution into the liquid-fertilizer holding vessel;

adding at least one compound to the liquid-fertilizer solution, the compound being added to a concentration which exceeds the solubility of the compound in the liquid-fertilizer solution; and coating the compound onto an internal surface of the liquid-fertilizer holding vessel to form a protective layer over the internal surface.

In yet another aspect, an anti-corrosion mixture comprising:

a liquid nitrogen fertilizer solution; and a quaternary-amine-comprising compound within the liquid nitrogen fertilizer solution.

More specifically, the present invention pertains to methods of using quaternary-amine-comprising compounds for reducing corrosion in liquid-fertilizer holding vessels.

One aspect of the invention is described with reference to FIGS. 1 and 2. Referring to FIG. 1, a liquid-fertilizer holding vessel 10 is shown in cross-section. Liquid-fertilizer holding vessel 10 comprises a vessel wall 16 having an internal surface 18 and an external surface 20. Internal surface 18 defines an internal sidewall of vessel 10.

Within liquid-fertilizer holding vessel 10 is a layer of liquid-fertilizer solution 12 and a separate solvent layer 14 adjacent layer 12. Above layers 12 and 14 is a head space 15. Preferably, separate solvent layer 14 is an alcohol-comprising layer. In the shown preferred embodiment, alcohol-comprising layer 14 is less dense than liquid-fertilizer solution 12 and therefore floats above liquid-fertilizer solution 12.

Within solvent layer 14 is at least one corrosion inhibiting compound which is more soluble in solvent layer 14 than in liquid-fertilizer solution 12. Preferably, the compound is a quaternary-amine-comprising compound, and most preferably the quaternary-amine-comprising compound comprises at least one relatively long alkyl chain, such as an alkyl comprising from 10 to 18 carbon atoms, chemically attached to the quaternary amine. Among the preferred quaternary-amine-comprising compounds are those having a general chemical formula of alkyl dimethyl benzyl ammonium chloride, the alkyl most preferably comprising $C_{12}$, $C_{14}$, or $C_{16}$. Suitable quaternary-amine-comprising compounds can be purchased, for example, under the tradename BARQUAT® from Lonza, Inc. of Fair Lawn, N.J. For instance, BARQUAT® MB-80 comprises alkyl dimethyl benzyl ammonium chloride, with the alkyl comprising 40% $C_{12}$, 50% $C_{14}$, and 10% $C_{16}$.

Preferably, the corrosion inhibiting compound is added to the liquid fertilizer solution to a concentration which exceeds the solubility of the compound in the liquid-fertilizer solution. Accordingly, the corrosion inhibiting compound is only partially soluble in the solution, and some of the compound will not be in the solution. The compound can be added directly to liquid-fertilizer solution 12 without a separate solvent, and therefore without formation of the separate solvent layer 14. In such cases, at the preferable concentrations of compound exceeding its solubility in solution 12, some of the compound will not be in solution, and will generally either be suspended within and above the solution, or be below the solution.

Referring to FIG. 1, one method for adding a quaternary-amine-comprising compound to the liquid fertilizer is to add a solution of quaternary amine into a liquid-fertilizer holding vessel 10, which is substantially filled with liquid fertilizer. Typically, quaternary amine solution will comprise about 80% quaternary amine, and about 20% solvent, most preferably alcohol. An example suitable quaternary amine solution is the above-described BARQUAT® MB-80 which comprises about 80% quaternary amine compounds and about 20% solvent.

Preferably, the amount of quaternary amine solution 14 added to liquid-fertilizer solution 12 brings the total concentration of quaternary-amine-comprising compounds within holding vessel 10 from about 50 parts per million (ppm) to about 400 ppm, and most preferably to about 150 ppm. At such preferable concentrations of quaternary-amine-comprising compound, the concentration of quaternary amine in liquid fertilizer exiting a holding vessel 10 has been empirically determined to be between about 14 ppm and about 20 ppm. An example method of forming a preferable concentration of quaternary-amine-comprising compound within a vessel 10 is to add approximately six fluid ounces of an 80% quaternary amine solution to about one metric ton of liquid-fertilizer solution.

After quaternary amine solution 14 is provided within vessel 10, some of the quaternary amine disperses into fertilizer 12, some remains within the solvent layer 14, and some coats the internal sidewall 18. The quaternary amine thus forms a layer 50 (shown in FIG. 6) over internal surface 18. Preferably, quaternary amine solution 14 will be added to the liquid fertilizer 12 with agitation to enhance dispersal of quaternary-amine-comprising compound throughout liquid fertilizer 12 and accordingly throughout the interior of vessel 10. However, regardless of whether the liquid fertilizer is agitated during the initial addition of quaternary amine solution to the fertilizer, the quaternary-amine-comprising compound will eventually disperse throughout the solution 12 and throughout the interior of vessel 10.

The coating of interior surface 18 is enhanced by the draw-down of liquid fertilizer from vessel 10 as fertilizer is removed from the vessel. This is illustrated with reference to FIGS. 1 and 2. Referring first to FIG. 1, the liquid fertilizer 12 has an upper level 24 within holding vessel 10 when vessel 10 is substantially filled with liquid fertilizer 14. Referring next to FIG. 2, the liquid fertilizer upper level 24 falls within vessel 10 as the liquid fertilizer is drawn down in the vessel. The liquid fertilizer is typically drawn down by flowing the fertilizer out of the vessel through an outlet (not shown).

As upper level 24 falls, layer 14 is pulled across internal surface 18 and layer 50 is deposited across substantially all of internal surface 18. Through repeated cycling of the steps of, 1) filling vessel 10 with fertilizer 12; and 2) removing fertilizer 12 from the vessel 10, layer 50 continues to accumulate quaternary-amine-comprising compound and thicken. Accordingly, layer 50 eventually becomes a substantially protective layer over the internal surface 18, and can reduce corrosion of internal sidewall 18. Layer 50 can reduce corrosion by a number of mechanisms. For instance, layer 50 can act as a barrier to impede the attack of chemicals from the liquid-fertilizer solution 12 against surface 18. Also, layer 50 can inhibit atmospheric constituents, such as oxygen, from attacking portions of internal surface 18 in the head space 15.

An additional advantage of floating quaternary-amine-containing compound/solvent layer 14 over liquid fertilizer 12 is that a number of particulates tend to be drawn from solution 12 and into layer 14. For instance, particulates comprising predominantly organic matter appear to generally migrate from fertilizer 12 and into layer 14. Accordingly, layer 14 can tend to clarify a liquid-fertilizer solution 12, and thereby enhance the marketability of the solution 12. Also, by reducing corrosion, the corrosion inhibiting compound can reduce sludge formation, and thereby further aid in maintaining the clarity of a liquid fertilizer solution.

Figure 4:
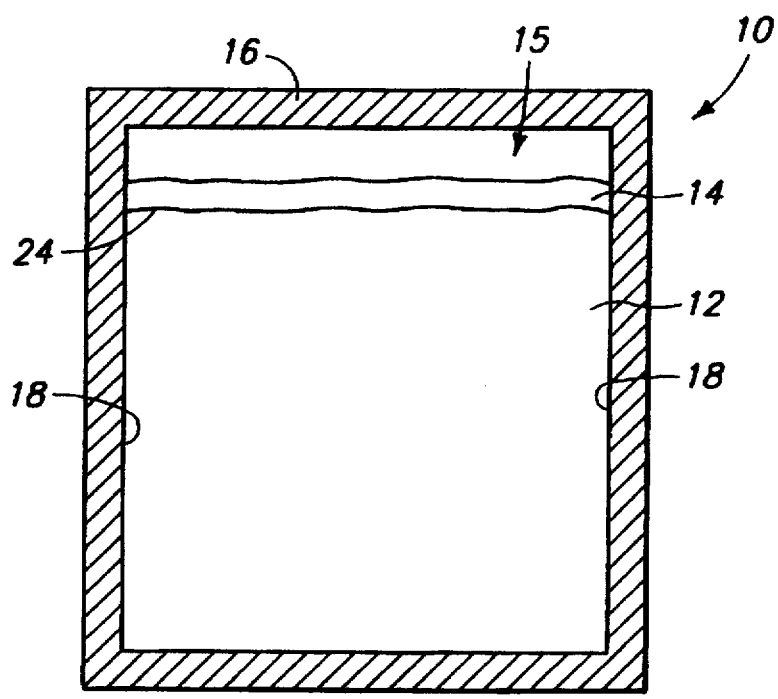
FIG. 4 is a view of the FIG. 3 vessel at a step subsequent to that of FIG. 3.

A second embodiment of the method of the present invention is described with reference to FIGS. 3 and 4. Referring first to FIG. 3, quaternary amine solution 14 is provided within vessel 10 prior to provision of liquid fertilizer within the vessel. Subsequently, liquid fertilizer 12 (shown in FIG. 4) is flowed into the vessel, through an inlet (not shown). The in-flow of liquid fertilizer agitates quaternary amine solution 14 and thereby disperses the quaternary amine solution into the liquid fertilizer. Preferably, solution 14 will be the same preferable alcohol-containing solution described previously. Accordingly, the alcohol-containing solution 14 will eventually separate from the liquid-fertilizer solution 12 to form a layer over the solution 12 as shown in FIG. 4. Occasionally, prior to the clean separation of layers 14 and 12, it has been found that a foam forms over the layer 12. However, this foam inevitably collapses to form the illustrated liquid layers 12 and 14.

As discussed previously regarding FIGS. 1 and 2, repeated cycling of liquid fertilizer into and out of vessel 10 will raise and lower an upper surface 24 of the fertilizer layer 12, resulting in the formation of a protective layer 50 (shown in FIG. 6) over internal surface 18 of vessel 10.

It is noted that the thickness of layer 14 typically decreases over time, presumably due to volatilization of solvent from the layer 14. For instance, if layer 14 is initially about an inch thick, it will typically reduce to about ⅛ of an inch thick in about eight to nine months time.

Also, it is noted that a used layer 14 can be eventually removed from a vessel 10 and replaced with a fresh layer 14. As the liquid-fertilizer storage vessels 10 are generally emptied once a year, and cleaned, it is considered that solution 14 can be relatively conveniently replaced about once per year.

An alternate aspect of the invention is to add a quaternary-amine-comprising compound to a liquid-fertilizer in a mobile transporting vessel, such as a truck or rail car, and to then transport the mixture of quaternary-amine comprising compound and liquid-fertilizer to a stationary liquid-fertilizer holding vessel. Additionally, the quaternary-amine-comprising can be added to liquid fertilizer at a liquid-fertilizer production facility and subsequently transported to stationary holding vessels.

In alternative embodiments of the invention, the quaternary-amine-comprising compound can be sprayed onto an internal surface 18 of a vessel 10, or brushed onto the surface. However, it has been found to be generally most expedient to coat the surface 18 through one or both of the embodiments discussed with reference to FIGS. 1–4 above.

Figure 5:
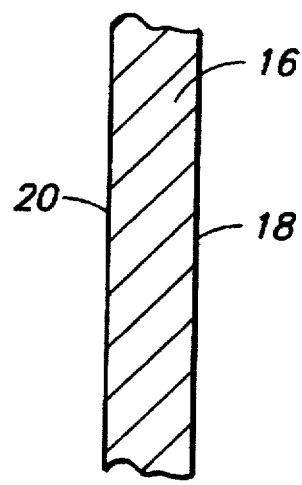
FIG. 5 is a fragmentary cross-sectional diagrammatic side view of a liquid-fertilizer holding vessel prior to treatment by the method of the present invention.
Figure 6:
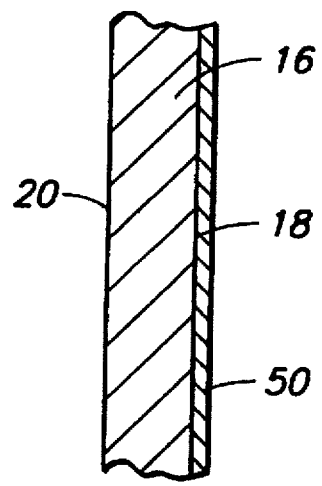
FIG. 6 is a view of the FIG. 5 vessel after treatment by the method of the present invention.

The formation of protective layer 50 is described with reference to FIGS. 5 and 6. Referring first to FIG. 5, a partial cross-section of vessel wall 16 is shown prior to contact of the internal surface 18 with a quaternary-amine-comprising compound. In FIG. 6, the vessel wall 16 is shown after contact of internal surface 18 with the quaternary-amine-comprising compound, illustrating the formation of a protective layer 50 over internal surface 18.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An anti-corrosion treatment method of reducing internal corrosion of a liquid nitrogen fertilizer holding vessel comprising:

providing a quaternary-amine-comprising compound within the holding vessel;

flowing a liquid nitrogen fertilizer solution within the holding vessel after providing the quaternary-amine-comprising compound, the liquid nitrogen fertilizer solution having an upper level within the vessel, the liquid nitrogen fertilizer solution upper level rising within the vessel as the fertilizer solution is flowed into the vessel, the quaternary-amine-comprising compound being at least partially insoluble in the liquid nitrogen fertilizer solution and forming a quaternary-amine comprising layer over the liquid nitrogen fertilizer solution, the quaternary-amine-comprising compound coating an internal sidewall of the vessel as the liquid nitrogen fertilizer solution upper level rises.

2. The method of claim 1 wherein the quaternary-amine-comprising compound is substantially insoluble in the liquid nitrogen fertilizer solution.

3. The method of claim 1 wherein the liquid nitrogen fertilizer solution comprises urea ammonium nitrate.

4. The method of claim 1 wherein the liquid nitrogen fertilizer solution comprises ammonium polyphosphate.

5. The method of claim 1 wherein the liquid nitrogen fertilizer solution comprises calcium ammonium phosphate.

6. The method of claim 1 wherein the liquid nitrogen fertilizer solution comprises ammonium sulfate.

7. The method of claim 1 wherein the holding vessel internal sidewall comprises steel.

8. The method of claim 1 wherein the liquid nitrogen fertilizer solution comprises a nitrogen fertilizer, the nitrogen fertilizer consisting essentially of one or more fertilizers selected from the group consisting of ammonium nitrate, urea ammonium nitrate, ammonium sulfate, and calcium ammonium nitrate.

9. An anti-corrosion treatment method of reducing internal corrosion of a liquid nitrogen fertilizer holding vessel comprising:

filling the vessel with a liquid nitrogen fertilizer solution;

after filling the vessel with the liquid nitrogen fertilizer solution, providing a quaternary-amine-comprising compound within the holding vessel, the quaternary-amine-comprising compound being at least partially insoluble in the liquid nitrogen fertilizer solution and forming a quaternary-amine comprising layer over the liquid nitrogen fertilizer solution; and flowing the liquid nitrogen fertilizer solution out of the holding vessel after providing the quaternary-amine-comprising compound within the holding vessel, the liquid nitrogen fertilizer solution having an upper level within the vessel, the liquid nitrogen fertilizer solution upper level falling within the vessel as the fertilizer solution is flowed out of the vessel, the quaternary-amine-comprising compound coating an internal sidewall of the vessel as the liquid nitrogen fertilizer solution upper level falls.

10. The method of claim 9 wherein the quaternary-amine-comprising compound is substantially insoluble in the liquid nitrogen fertilizer solution.

11. The method of claim 9 wherein the liquid nitrogen fertilizer solution comprises urea ammonium nitrate.

12. The method of claim 9 wherein the liquid nitrogen fertilizer solution comprises ammonium polyphosphate.

13. The method of claim 9 wherein the liquid nitrogen fertilizer solution comprises calcium ammonium phosphate.

14. The method of claim 9 wherein the liquid nitrogen fertilizer solution comprises ammonium sulfate.

15. The method of claim 9 wherein the holding vessel internal sidewall comprises steel.

16. The method of claim 9 wherein the liquid nitrogen fertilizer solution comprises a nitrogen fertilizer, the nitrogen fertilizer consisting essentially of one or more fertilizers selected from the group consisting of ammonium nitrate, urea ammonium nitrate, ammonium sulfate, and calcium ammonium nitrate.

17. An anti-corrosion treatment method of reducing internal corrosion of a liquid nitrogen fertilizer holding vessel comprising providing a quaternary-amine-comprising compound to a concentration of from about 50 ppm to about 400 ppm in liquid nitrogen fertilizer within the vessel.

18. The method of claim 17 wherein the liquid nitrogen fertilizer solution comprises a nitrogen fertilizer, the nitrogen fertilizer consisting essentially of one or more fertilizers selected from the group consisting of ammonium nitrate, urea ammonium nitrate, ammonium sulfate, and calcium ammonium nitrate.

19. A treatment method of improving clarity in a liquid-fertilizer product comprising providing at least one quaternary-amine-comprising compound within the liquid-fertilizer product.

20. A treatment method of reducing sludge formation in a liquid-fertilizer product comprising providing at least one quaternary-amine-comprising compound within the liquid-fertilizer product.

21. An anti-corrosion treatment method of reducing corrosion of a liquid-fertilizer holding vessel comprising:
flowing a liquid-fertilizer solution into the liquid-fertilizer holding vessel;
adding at least one compound to the liquid-fertilizer solution, the compound being added to a concentration which exceeds the solubility of the compound in the liquid-fertilizer solution; and
coating the compound onto an internal surface of the liquid-fertilizer holding vessel to form a protective layer over the internal surface.

22. The method of claim 21 wherein the compound is provided in a solvent layer within the vessel, the solvent layer being a separate insoluble layer from the liquid-fertilizer solution.

23. The method of claim 21 wherein the compound is provided in a solvent layer within the vessel, the solvent layer being a separate insoluble layer from the liquid-fertilizer solution and being over the liquid-fertilizer solution.

24. The method of claim 21 wherein the compound is provided within the vessel prior to flowing the liquid-fertilizer solution into the vessel.

25. The method of claim 21 wherein the compound is provided within the vessel after flowing the liquid-fertilizer solution into the vessel.

26. The method of claim 21 wherein the liquid nitrogen fertilizer solution comprises a nitrogen fertilizer, the nitrogen fertilizer consisting essentially of one or more fertilizers selected from the group consisting of ammonium nitrate, urea ammonium nitrate, ammonium sulfate, and calcium ammonium nitrate.

27. An anti-corrosion treatment method of reducing corrosion of a liquid nitrogen fertilizer holding vessel comprising:
providing a substantially insoluble liquid film of a quaternary-amine-comprising compound over a volume of liquid nitrogen fertilizer within a steel vessel; and
coating internal sidewalls of the steel vessel with the quaternary-amine-comprising compound as the volume of liquid fertilizer increases and decreases within the vessel.

28. The method of claim 27 wherein the quaternary-amine-comprising compound comprises alkyl dimethyl benzyl ammonium chloride, the alkyl comprising at least 12 carbon atoms.

29. The method of claim 27 wherein the quaternary-amine-comprising compound comprises alkyl dimethyl benzyl ammonium chloride, the alkyl comprising from 12 to 16 carbon atoms.

30. The method of claim 27 wherein the liquid nitrogen fertilizer solution comprises a nitrogen fertilizer, the nitrogen fertilizer consisting essentially of one or more fertilizers selected from the group consisting of ammonium nitrate, urea ammonium nitrate, ammonium sulfate, and calcium ammonium nitrate.

31. An anti-corrosion treatment method of reducing corrosion of a stationary liquid nitrogen fertilizer holding vessel comprising:
providing a quaternary-amine-compound in a mixture with liquid-fertilizer solution in a mobile liquid-fertilizer transporting vessel the quaternary-amine-comprising compound comprising alkyl dimethyl benzyl ammonium chloride, the alkyl comprising at least 12 carbon atoms; and
flowing the mixture from the mobile transporting vessel to the stationary vessel.

32. The method of claim 31 wherein the liquid nitrogen fertilizer solution comprises a nitrogen fertilizer, the nitrogen fertilizer consisting essentially of one or more fertilizers selected from the group consisting of ammonium nitrate, urea ammonium nitrate, ammonium sulfate, and calcium ammonium nitrate.

33. An anti-corrosion treatment method of reducing internal corrosion of a liquid nitrogen fertilizer holding vessel comprising providing at least one quaternary-amine-comprising compound within the vessel, the quaternary-amine-comprising compound comprising alkyl dimethyl benzyl ammonium chloride, the alkyl comprising at least 12 carbon atoms.

34. An anti-corrosion mixture, comprising:
a liquid solution comprising a nitrogen fertilizer, the nitrogen fertilizer consisting essentially of one or more fertilizers selected from the group consisting of ammonium nitrate, urea ammonium nitrate, ammonium sulfate, and calcium ammonium nitrate; and
a quaternary-amine-comprising compound within the liquid solution, the quaternary-amine-comprising compound comprising alkyl dimethyl benzyl ammonium chloride.

35. The anti-corrosion mixture of claim 34 wherein the alkyl of the alkyl dimethyl benzyl ammonium chloride comprises at least 12 carbon atoms.

36. The anti-corrosion mixture of claim 34 wherein the alkyl of the alkyl dimethyl benzyl ammonium chloride comprises from 12 to 16 carbon atoms.

37. The anti-corrosion mixture of claim 34 wherein the quaternary-amine-comprising compound is present within the liquid solution in a concentration of from about 14 ppm to about 20 ppm.

38. The anti-corrosion mixture of claim 34 wherein the quaternary-amine-comprising compound is present within the liquid solution in a concentration which exceeds a solubility limit of the quaternary-amine-comprising compound in the liquid solution.

39. An anti-corrosion mixture, comprising:
a liquid-fertilizer solution; and
at least one quaternary-amine-comprising compound combined with the liquid-fertilizer solution, the quaternary-amine-comprising compound being present to a concentration which exceeds the solubility of the quaternary-amine-comprising compound in the liquid-fertilizer solution, the quaternary-amine-comprising compound comprising alkyl dimethyl benzyl ammonium chloride.

* * * * *

UNITED STATES PATENT AND TRADEMARK OFFICE
CERTIFICATE OF CORRECTION

PATENT NO.    : 5,731,032

DATED         : March 24, 1998

INVENTOR(S)   : Michael L. Orr

It is certified that error appears in the above-identified patent and that said Letters Patent is hereby corrected as shown below:

Column 5, l. 36: After "comprising" insert --compound--.

Signed and Sealed this

Twenty-third Day of June, 1998

Attest:

BRUCE LEHMAN

*Attesting Officer*     *Commissioner of Patents and Trademarks*